United States Patent [19]
Brady et al.

[11] Patent Number: 5,355,478
[45] Date of Patent: Oct. 11, 1994

[54] METHOD FOR AVOIDING CACHE MISSES DURING EXTERNAL TOURNAMENT TREE REPLACEMENT SORTING PROCEDURES

[75] Inventors: James T. Brady, San Jose; Balakrishna R. Iyer, Mountain View, both of Calif.

[73] Assignee: International Business Machines Corporation, Armonk, N.Y.

[21] Appl. No.: 813,237

[22] Filed: Dec. 23, 1991

[51] Int. Cl.$^5$ ............................................. G06F 7/24
[52] U.S. Cl. ................................ 395/600; 395/425; 364/DIG. 1; 364/222.81; 364/222.9; 364/243; 364/243.4; 364/243.41; 364/246
[58] Field of Search ..................... 395/600, 425; 340/146.2

[56] References Cited

U.S. PATENT DOCUMENTS

| | | | |
|---|---|---|---|
| 3,611,316 | 10/1971 | Woodrum | 395/800 |
| 3,713,107 | 1/1973 | Barsamian | 340/172.5 |
| 3,931,612 | 1/1976 | Stevens et al. | 395/600 |
| 4,090,249 | 5/1978 | Chen et al. | 395/600 |
| 4,210,961 | 7/1980 | Whitlow et al. | 395/600 |
| 4,417,321 | 11/1983 | Chang et al. | 395/600 |
| 4,575,798 | 3/1986 | Lindstrom et al. | 395/600 |
| 4,962,451 | 10/1990 | Case et al. | 364/900 |
| 5,175,857 | 12/1992 | Inoue | 395/800 |
| 5,179,699 | 1/1993 | Iyer et al. | 395/650 |
| 5,179,717 | 1/1993 | Sato et al. | 395/800 |
| 5,210,870 | 5/1993 | Baum et al. | 395/600 |
| 5,224,217 | 6/1993 | Zangenehpour | 395/425 |
| 5,274,805 | 12/1993 | Ferguson et al. | 395/600 |
| 5,287,494 | 2/1994 | Garcia et al. | 395/600 |

OTHER PUBLICATIONS

Knuth, Donald E., "The Art of Computer Programming," vol. 3/Sorting and Searching, 1973, pp. 247–266, Addison-Wesley Publishing Company, Inc.
Tremblay, Jean-Paul et al, "An Introduction to Data Structures with Applications," 1984 by McGraw-Hill, Inc., pp. 678–696.

*Primary Examiner*—Paul V. Kulik
*Attorney, Agent, or Firm*—Baker, Maxham, Jester & Meador

[57] ABSTRACT

A method and apparatus for avoiding line-accessed cache misses during a replacement/selection (tournament) sorting process. Prior to the sorting phase, the method includes the steps of sizing and writing maximal sets of sub-tree nodes of a nested ordering of keys, suitable for staging as cache lines. During the sort phase, the method includes the steps of prefetching into cache from CPU main memory one or more cache lines formed from a sub-tree of ancestor nodes immediate to the node in cache just selected for replacement. The combination of the clustering of ancestor nodes within individual cache lines and the prefetching of cache lines upon replacement node selection permits execution of the full tournament sort procedure without the normally-expected cache miss rate. For selection trees larger than those that can fit entirely into cache, the method avoids the second merge phase overhead that formerly doubled the sorting time necessary for larger cache sizes.

6 Claims, 3 Drawing Sheets

METHOD FOR AVOIDING CACHE MISSES DURING EXTERNAL TOURNAMENT TREE REPLACEMENT SORTING PROCEDURES

BACKGROUND OF THE INVENTION

1. Field of the Invention

The present invention relates generally to two-phase external selection and merge record key sorting procedures, and more particularly, to a method for minimizing line-accessed cache misses during an external tournament tree replacement sorting procedure.

2. Discussion of the Related Art

The tournament sort is so-called because it matches items against each other just as people are matched against each other in setting up a tennis tournament. The original list is divided in pairs. The winner of each pair is determined and this set becomes the first auxiliary list. First-stage winners are paired and compared to identify second-stage winners. The second-stage winner's list, is paired, in turn, and so forth. The final pair of winners is matched to determine a final winner. The winner in a tournament sort is the lesser-valued key. Thus, the least key in the tournament selection tree is the first key on the sorted output list.

A systematic procedure for such a tournament sort is well-known in the art. For instance, refer to Ivan Flores, "Computer Sorting", pp. 70–84, Prentiss-Hall, Inc., Inglewood Cliffs, N.J. (1969). The classical selection tree or tournament sort removes each "winner" in turn to an output list, and repeats the selection procedure for the keys remaining in the selection tree. The sort is ended when all keys contained in the original tree nodes are exhausted. Thus, a selection tree having P nodes occupies P memory locations and generates an output sort string or "run" of length P. For data sets too large to fit into P memory locations, a series of tournament sorts is employed to create a series of output runs of length P, which are then merged in some manner.

The replacement tournament sort improves on the classical tournament sort by replacing the "winner" with a new key from the list of keys to be sorted. Thus, the contents of the P-node selection tree in memory are perpetually replenished. The fundamental problem with the replacement tournament sort is the management of new replacement keys that are less than the "winner" previously written to the output run.

One method for managing such new keys is to label them as ineligible for participation in the present run. Thus, over time, the selection tree in memory fills with ineligible keys. When all eligible keys are exhausted, the current output run is ended and a new run is begun merely by globally qualifying all previously ineligible keys. The new output run then builds as before, with the replacement tree again slowly filling with new ineligible keys. This process continues indefinitely (as explained in detail by Flores at pp. 121–128), creating a group of sorted output runs that are then merged. Although similar in effect to the nonreplacement tournament sort, this replacement tournament sort method creates longer output runs, with an average length of 2P sorted keys. Refer to Knuth, "Art of Computer Programming", *Volume 3/Sorting and Searching*, pp. 247–263, Addison-Wesley Publ. Co., Menlow Park, Calif. (1973), for a discussion of this run length enhancement effect for replacement tournament sorts.

A suitable method for labelling ineligible keys is to add an output run number as the most significant element of the key. In such a scheme, all incoming keys are immediately augmented by the addition of the current run number to the most significant key position. The run number remains in place until the key "wins" and can be stripped when the key is written to the sorted output run tables outside of memory. When the replacement key entering memory is tested and found to be less than the last selected key written to the sorted output run, the replacement key is made "ineligible" simply by incrementing the current run number by one before augmenting the ineligible key. Thus, it is appreciated in the art that such run number manipulation is sufficient to ensure that a replacement key is never less than the selected key being replaced. After completion of the initial phase of such a replacement tournament selection sort, several sorted runs having an average length of 2P keys are available in output storage for the second merging phase to be conducted in any suitable manner known in the art.

In U.S. Pat. No. 3,713,107, Harut Barsamian discloses a systematic architecture for the electronic implementation of a tournament sorting procedure that uses the main computer memory for storage of the selection tree nodes. Barsamian discusses the above-described replacement tournament tree sort but does not consider the efficiency problems arising from the addition of cache buffer memory to the processing system.

In U.S. Pat. No. 4,962,451, Douglas R. Case, et al, disclose a new use of a LRU-managed CPU data cache for generation of sorted key runs. Case, et al teach a method for improved caching efficiency that keeps the cached sub-tree size small enough to avoid triggering the cache LRU discipline for moving new lines into cache. The means and method disclosed by Case, et al replaces the prior art taught by Barsamian and thereby obtains a processing speed advantage.

Other practitioners in the art have more recently attempted to improve caching efficiency to enhance replacement tournament sorting procedures. This is a keenly-felt problem in the art, especially for external replacement selection tree sorts involving large numbers of records and limited cache space.

As stored in cache or main memory, the tournament tree nodes normally contain pointers to "losing" sort keys remaining in the tournament. When a "winner" is identified at the root node of the selection tree, the key referenced by the root node pointer is written to the sorted output run and the corresponding leaf node is replaced with a new key pointer from the external list to be sorted. The pointers in the parent and ancestor nodes of the updated leaf node must then be changed to reflect a new winners. The winner changes propagate upwards along the ancestor node path to the root node in a manner well-known in the art. The only nodes subject to change in the selection tree are those nodes on the updating path from the replaced leaf node to the root node of the tree.

Comparison at each node in the updating path requires access to the actual values of the sort keys referenced by the node pointers. Because it is not usually desirable to fit all such sort keys into the cache memory (because of size constraints), this pointer technique entails a large number of CPU cache misses.

Such cache misses can be reduced by either adding the bulky sort keys to the nodes in cache or through the use of less bulky offset value codes. But, neither technique avoids the cache misses resulting from the displacement of the parent node on the updating path from the child node at the lower levels. Examination of FIG. 2, showing a typical 63 node selection tree, demonstrates that the displacement of any parent node(i) is floor(i/2). That is, for large trees, the parent node is about half-way from the root node to the child node in terms of code word storage sequence. Hence, except for the root and the root's immediate children and grandchildren, the parent node is located in a different cache line from the child node for all nodes in the selection tree. If the tree is too large for main memory, almost every parent access will be a cache miss.

The previous solution known in the art and discussed above is to select in a first phase with the maximum tree of P nodes that fits into CPU cache and to invoke one or more merge passes in a second phase. This second merging operation doubles the CPU cycle cost of such sorting procedures, a deplorable overhead penalty that is required only because the cache storage size of P is insufficient for the tree sorted. This is a well-known problem in the art, as will be appreciated when referring to the Knuth reference wherein extensive attention is given to increasing output run lengths from trees of fixed size.

The related unresolved problems and deficiencies are clearly felt in the art and are solved by the present invention in the manner described below.

SUMMARY OF THE INVENTION

The methods of the present invention include suitable clustering of the child nodes with their parent and ancestor nodes and the prefetching of ancestor nodes to reduce both the number of cache misses and the rate of cache line movement into cache. Several alternative clustering arrangements are useful, each having the following properties. Firstly, parent nodes are put in the same cache line as their children nodes wherever possible. Secondly, the number of ancestor node generations accommodated in a single cache line is limited to a predetermined value. Thirdly, the higher ancestor nodes of the single cache line clusters are themselves recursively clustered in a series of other cache lines. Finally, given a leaf node, the cache lines containing all ancestor nodes on the updating path to the root node are determined according to a simple relationship, making it possible to prefetch all such cache lines.

It is an object of this invention to minimize or completely avoid cache misses during the selection phase of an external tournament tree replacement sorting procedure. It is an advantage of the methods of this invention that this objective is met using simple procedures for clustering and prefetching selection tree node data.

Although it is broadly known to prefetch keys arranged in cache line form from main memory on a linearly addressed basis, whereby a line of next higher address is fetched when a line of next lower address is accessed, nothing has previously been taught or suggested regarding the packing of cache lines with subtree node clusters as part of a replacement tree sorting procedure. Furthermore, nothing in the art either teaches or suggests the prefetching of cache lines from main memory containing immediate and distant ancestors on the update path of a node currently replaced in cache. It is an unexpected advantage of this invention that both techniques operate as measures minimizing cache misses.

The foregoing, together with other features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiment illustrated in the accompanying drawings, wherein:

FIG. 1, comprising

FIG. 2, comprising 2A-2B, illustrates two stages of a 63-node tournament tree organized in a manner known in the prior art.

DETAILED DESCRIPTION OF THE PREFERRED EMBODIMENT

Description of the Tournament Tree Sort

Figure 1A:
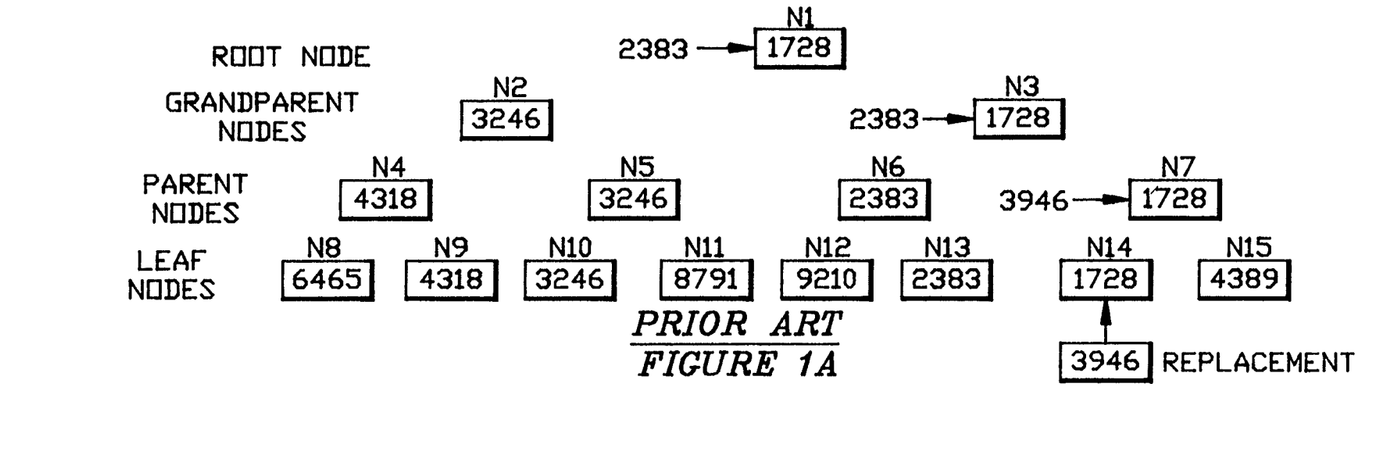
FIGS. 1A-1B, illustrates a 15-node tournament tree replacement sorting operation known in the prior art.
Figure 1B:
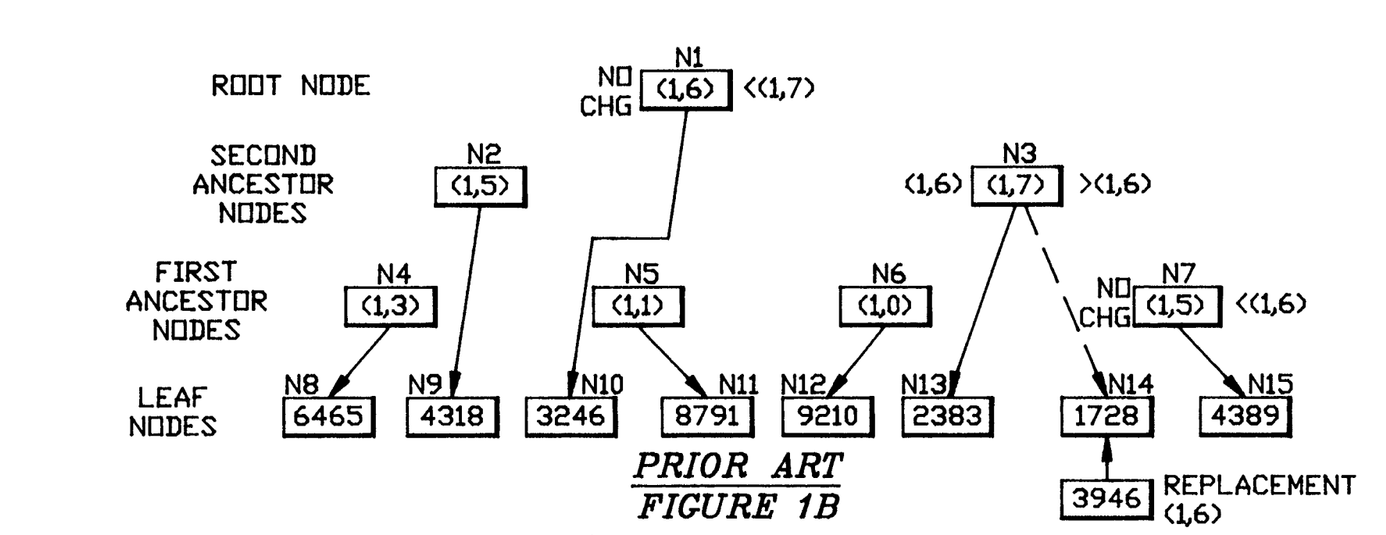

The replacement-selection (tournament) tree sorting procedure is usually implemented in the manner illustrated in FIGS. 1A-1B. Considering FIG. 1A, a 15-node selection tree is illustrated. Eight keys are depicted in leaf nodes N8-N15. The parent nodes N4-N7 contain the winning keys from the associated leaf node pairs. That is, parent node N4 contains key 4318 because it is the lesser or "winner" between key 6465 and key 4318 in leaf nodes N8 and N9. The contents of parent nodes N5-N7 are similarly determined.

The contents of grandparent nodes N2-N3 are also determined by selecting a winning key from each associated parent node pair. Finally, the content of root node N1 is determined by selecting a winning key from the associated grandparent node pair N2-N3.

In FIG. 1A, ancestor nodes N1-N7 are shown containing the winning keys to better illustrate the upward tournament competition leading to the arrival at root node N1 of the least key from among leaf nodes N8-N15. However, as is well-known in the art, the selection tree is much more useful if the contents of the ancestor nodes include a pointer to the LOSING key in the leaf nodes below, as illustrated in FIG. 1B. The reasons for this can be appreciated by referring, for instance, to the Knuth or Flores references cited above.

FIG. 1A further illustrates the effects of replacing winning key 1728 at leaf node N14 with a new key from the external list (not shown) of keys to be sorted. The effects of replacing key 1728 at leaf node N14 with new key 3946 can be appreciated by inspecting the ancestor nodes along the updating path between leaf node N14 and root node N1. This updating path includes parent node N7, grandparent node N3 and root node N1. Because each of these nodes is pointing to the winning key 1728 (that no longer exists in the tree), every such node must now be changed. This is very inefficient and illustrates the primary reason for storing losing keys in ancestor nodes instead of winning keys.

Figure 1B illustrates a more efficient method known in the art for using an external replacement-selection tree to sort a series of keys. The contents of all ancestor nodes are limited to an "offset value code" (OVC) and a loser pointer representing the results of the competition immediately below. In addition to the OVC shown in each ancestor node N1-N7, there is also a pointer field (not shown) that points to the losing key in memory. These pointer fields are represented by arrows from each ancestor node to the losing key leaf node referenced by the pointer field (not shown). Thus, for instance, ancestor node N7 points to the loser between leaf nodes N14–N15 containing the larger key 4389.

The OVC at node N7 is configured having two parts: (a) the position at which the two keys differ, and (b) the compliment of the losing key value in that position. At ancestor node N7, the position of difference in the child nodes N14–N15 is the highest order decimal position (1) and the compliment of the most significant losing decimal 4 base 10 is $9-4=5$. Similarly, ancestor node N3 contains the OVC of the tournament between ancestor nodes N6–N7; i.e., the OVC of 2383 against 1728. Thus, root node N1 contains the OVC of 3246 against 1728 which is (1,6). Key 1728 is the winner at root node N1 and is replaced by a new key 3946 as shown at leaf node N14.

An additional advantage of the OVC technique is that the ancestor node OVC need be changed only when the OVC from below is less than the OVC stored at the ancestor node. This is illustrated in FIG. 1B as follows.

The OVC for the replacement key at leaf node N14 is (1,6). This OVC is carried up to ancestor node N7 and found to be greater than the OVC (1,5) at ancestor node N7. Thus, ancestor node N7 wins and is left unchanged, with the replacement OVC being carried forward to node N3. Because the OVC (1,7) at ancestor node N3 is greater than replacement OVC (1,6), it loses and is replaced. The losing OVC (1,7) from ancestor node N3 is then carried upward to root node N1. Because the existing OVC (1,6) at root node N1 is less than the OVC (1,7) carried upward from ancestor node N3, OVC (1,6) wins and the contents of root node N1 are left unchanged.

Reviewing this procedure with respect to key values, remember that the new OVC at the leaf node N14 was computed by competing the new key against the most recent winner, 1728, giving the result (1,6) shown. Instead of comparing keys 3946 and 4389 at ancestor node N7, which may involve a cache miss to access key 4389, the known OVCs of these two keys against 1728 were compared. Thus, OVC (4389, 1728)=(1,5), which is available at node N7, compares low against OVC (3946, 1728)=(1,6), which was computed at node N14 replacement. Except for equal compares, these offset value codes compare adversely as the keys, and it is conclusively found that key 3946 wins over key 4389 without reference to key 4389. Special processing is required for equal compares, in a manner that obvious in view of this discussion.

The winning OVC (1,6) was carried forward from ancestor node N7 and compared with the OVC of key 2383 against key 1728, stored as (1,7) at ancestor node N3. Since OVC (1,7) compares high to OVC (1,6), key 2383 is the winner at ancestor node N3 and the OVC (1,7) at node N3 was carried forward for competition at root node N1. The OVC (1,6) from below representing winning key 2383 was left behind in ancestor node N3 and the node N3 key pointer was changed to point to the new losing key 3946 at leaf node N14. Because OVC (3946, 2383) equals OVC (3946, 1728), the OVC left behind points to the competition loser at ancestor node N3. This is the property that makes the OVC tournament technique effective and efficient.

The OVC (2383, 1728) taken forward to root node N1 was then compared with OVC (3246, 1728) stored in root node N1. In this competition, key 2383 is the winner because OVC (1,7) collated high. Thus, leaf node N13 containing key 2383 is the new replacement node and key 2383 is written to the sorted output run in external storage.

Again, note that the OVC at, say, ancestor node N4 indicates that keys 6465 and 4318 in leaf nodes N14 and N15 differ in the first decimal position and the value of the first decimal position of the losing key, complimented, is 3. Thus, the OVC comparing keys 6465 and 4318 is written as (1,3) at ancestor node N4. Similarly, ancestor node N2 points to losing key 4318 in leaf node N9 and contains OVC (1,5). The winning key at root node N1 is 1728 as discussed above in connection with FIG. 1A, but root node N1 points to losing key 3246 at leaf node N10.

When the winning key is written to the sorted run output file, it is immediately replaced with a new key from an external key list. This is illustrated as replacement key 3946 in FIG. 1B. Upon replacement, the first step involves computation of the OVC between winning key 1728 and replacement key 3946, which is (1,6) as discussed above.

Again, the only ancestor nodes affected by replacement of the key in leaf node N14 are the ancestor nodes in the direct path between leaf node N14 and root node N1. These are ancestor nodes N7, N3 and root node N1. As discussed above, the OVC can be used to update the tournament tree without the cache misses incurred to access and test the keys themselves.

Comparing the caching effects of the replacement procedure in FIG. 1A with the caching effects of the same replacement operation in FIG. 1B, note that only the OVC at ancestor node N3 was replaced in FIG. 1B. This represents a three-fold increase in caching efficiency over the method illustrated in FIG. 1A without regard to the storage savings arising from the shorter OVC field and clearly demonstrates the preferability of the loser-pointing Offset Value Code method for tournament tree sorting.

The method of FIG. 1B is highly efficient for selection trees that can be entirely contained in a single memory resource within a storage hierarchy. However, for larger trees contained in main memory, the Least Recent Used (LRU) line-oriented CPU cache discipline may not afford sufficient space to simultaneously manipulate all ancestor and leaf nodes within a single selection tree. In such instances, to avoid forcing a later merging operation, portions of the selection tree must be copied into cache from memory as necessary during the tournament selection process.

Considering FIG. 1B, this means that ancestor nodes N7, N3 and root node N1 must be moved into cache in response to replacement of the key in leaf node N14. Thus, even though the memory requirements of the ancestor nodes are minimized by substituting OVCs and losing key pointers for actual keys, the method illustrated in FIG. 1B does little to minimize cache misses arising from tree fragmentation. The reason for this can be better appreciated by considering the 63-node tree shown in FIG. 2A.

Figure 2A:
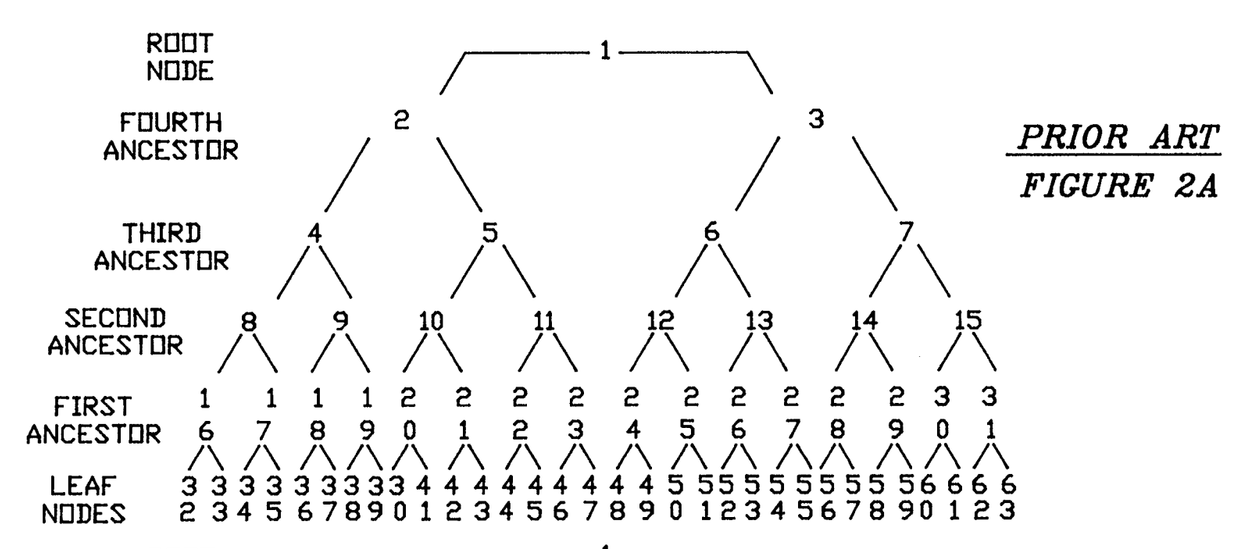

The tournament tree sorting procedure known in the art orders the root node, the ancestor nodes and the leaf nodes sequentially in memory in the manner illustrated in FIG. 2A. Thus, the displacement of the immediate parent node for, say, leaf node N45, is nearly half of the distance in code words from root node N1, being first ancestor node N22. Generally, the displacement of the parent of any node i is floor(i/2). The parent is never closer than about half-way to the root node from the child node. Thus, except for the root and its immediate children and grandchildren, the parent is in a different cache line from the child. This inevitably suggests that almost every parent node access is a cache miss if the entire tree does not fit in cache. The previous solution known in the art is to reduce the tree size for the tournament sorting procedure to the maximum tree that fits into the CPU cache and to then invoke one or more subsequent merging passes. These merging passes are known to at least double the CPU processing overhead for the tournament sorting procedure.

The Two Methods of this Invention

Suitable clustering of the nodes with their immediate ancestors and prefetching of the necessary ancestor nodes are the two key solutions to the caching efficiency problems discussed above. The methods of this invention dramatically reduce the number of cache misses and the number of lines called into the cache. Several alternative clustering arrangements are useful. Each useful clustering method shares the following properties:

(a) immediate parent nodes are placed on the same cache lines as their children nodes whenever possible;

(b) ancestor nodes only up to a selected previous generation limit are accommodated in a single cache line;

(c) ancestor nodes in generations beyond such selected previous generation limit are themselves recursively clustered into nested groups within other cache lines; and (d) the clustering is sufficiently systematic to permit immediate determination of the cache lines containing all ancestor nodes for any given leaf node, making it possible to prefetch all such cache lines.

In the discussion below, a preferred embodiment of both the clustering and the prefetching solutions to the cache miss problem is presented. To ensure simplicity of explanation, the storage utilization scheme has not been optimized for this discussion.

In this discussion, the IBM 370 instruction CFC is considered as exemplary. With the CFC instruction, each tournament tree node in FIG. 2A consists of 8 Bytes. These 8 Bytes include a 4 Byte Offset Value Code having 2 Bytes for the offset and 2 Bytes for the key at this offset. The remaining 4 Bytes contain the pointer field for the losing key. The CPU cache line is assumed to be 128 Bytes long. Hence, 16 code words can be fit into a single cache line. However, the IBM 370 CFCE instruction forms 8-Byte code words. The UPTE instruction expects to find the 8-Byte code words at quad-word boundaries, thus permitting 8 Bytes for an address field. Although the method of this invention applies without limit to code words using either the CFC or the CFCE instruction the CFCE code words are exemplary for purposes of illustration. This forces each code word to begin at quad-word boundaries. Accordingly, as can be appreciated by reference to any suitable system manual, such as IBM Systems/370 Principles of Operation (GA22-7000), International Business Machines Corporation, Armonk, N.Y., each 128-Byte cache line is limited to eight selection tree node code words of 8 Bytes each in view of these assumptions.

The storage clustering method of this invention is illustrated in the following examples. In FIG. 2A, a 63-node tournament tree is considered. The node code words are organized and clustered in main memory in the manner shown in Table 1 below.

TABLE 1

| | Cache Lines |
|---|---|
| | Section 1: |
| Line 1 | (4,5,6,7,2,3,1) |
| | Section 2: |
| Line 1 | (32,33,34,35,16,17,8) |
| Line 2 | (36,37,38,39,18,19,9) |
| Line 3 | (40,41,42,43,20,21,10) |
| Line 4 | (44,45,46,47,22,23,11) |
| Line 5 | (48,49,50,51,24,25,12) |
| Line 6 | (52,53,54,55,26,27,13) |
| Line 7 | (56,57,58,59,28,29,14) |
| Line 8 | (60,61,62,63,30,31,15) |

Figure 2B:
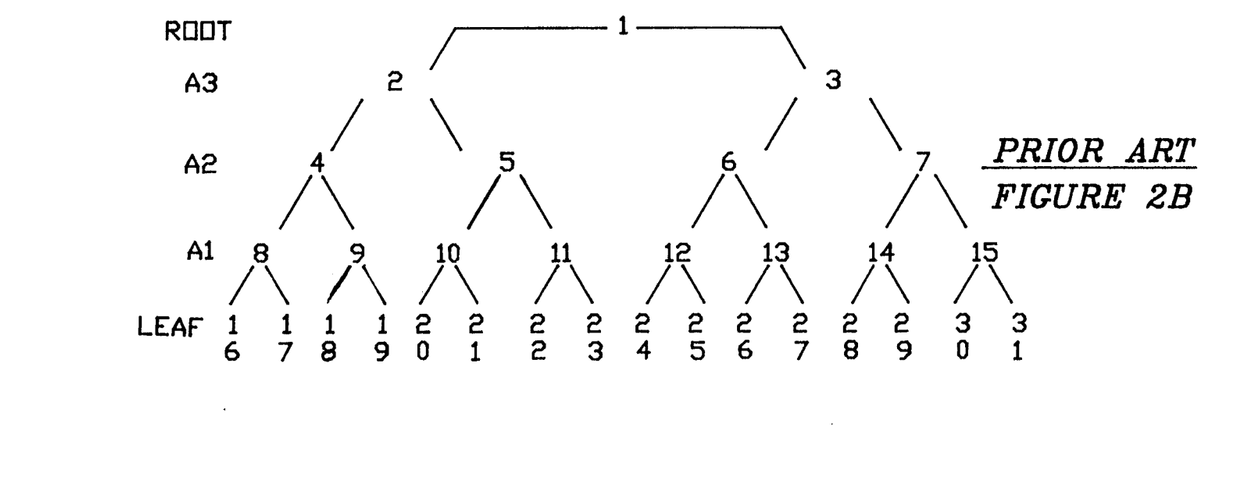

In FIG. 2B, a 31-node tournament tree is considered. Because there are fewer nodes, the cache line organization scheme is different from that illustrated in Table 1 and is shown in Table 2 below.

TABLE 2

| | Cache Lines |
|---|---|
| | Section 1: |
| Line 1 | (*,*,*,*,2,3,1) |
| | Section 2: |
| Line 1 | (16,17,18,19,8,9,4) |
| Line 2 | (20,21,22,23,10,11,5) |
| Line 3 | (24,25,26,27,12,13,6) |
| Line 4 | (28,29,30,31,14,15,7) |

Note that the cache lines are grouped into sections for each example. The largest section contains nodes from the bottom-most three generations. This three generation limit results from the eight code word limit for each cache line. The next smallest section includes the subsequent three generations, and so forth. The first section can include from one to three generations, depending on the number in the tree.

Alternatively, the first section could include three generations, with the final largest section left with from one to three generations. This alternative is potentially more wasteful of space and is not preferred.

Considering only the upper four node generations in FIG. 2B as a third example, a 15-node tournament tree should be clustered as shown in Table 3 below.

TABLE 3

| | Cache Lines |
|---|---|
| | Section 1: |
| Line 1 | (*,*,*,*,*,*,1) |
| | Section 2: |
| Line 1 | (8,9,10,11,4,5,2) |
| Line 2 | (12,13,14,15,6,7,3) |

Note that only seven nodes are included in a single cache line in Tables 1–3 above. These seven nodes include four children, their two parent nodes and their single grandparent node. Thus, a cache line with seven nodes contains nodes from three generations. Each group of three generations is segregated in a single section. It will be appreciated that the smallest section must contain the root node N1 and the largest section must contain all leaf nodes.

The node clustering method of this invention as illustrated above requires that no more than one node in any cache line have a parent node that is not within the same cache line. Thus, in Table 1 above, each of the cache lines contain only a single node with parents outside the line. It is this requirement that limits the number of code words per line to seven, although there is room for eight in our exemplary cache line.

The above example for 8-word cache lines can be quickly extended to other cache line sizes by those knowledgeable in the art. For instance, consider a 16-word cache line. Such a line is suitable for a 15-node cluster having only a single node with an external parent. An example of such a line, referring to FIG. 2A for node identification, would be (32,33,34,35,36,37,38,39,16,17,18,19,8,9,4). These lines must be grouped into sections of four generations each, starting with the leaf node generation and proceeding upward as before.

In view of this clustering method, the prefetching method of this invention requires only a simple, nonambiguous algorithm for determining the location of the parent node for any given child node. The parameters provided in Table 4 below illustrate the location of ancestor nodes by specifying their displacement, in terms of numbers of code words from the first cache line, for the tournament tree cache lines from Table 3.

TABLE 4

| Cache Lines | | | | | | | | |
|---|---|---|---|---|---|---|---|---|
| Section 1: | | | | | | | | |
| lin 0:Line 1 | (*, | *, | *, | *, | *, | *, | 1, | *) |
| Displacement | 0 | 1 | 2 | 3 | 4 | 5 | 6 | 7 |
| gen | * | * | * | * | * | * | 1 | * |
| gen.lin | * | * | * | * | * | * | 1 | * |
| pos | 0 | 1 | 2 | 3 | 4 | 5 | 6 | 7 |
| Section 2: | | | | | | | | |
| lin 1:Line 1 | (8, | 9, | 10, | 11, | 4, | 5, | 2, | *) |
| Displacement | 8 | 9 | 10 | 11 | 12 | 13 | 14 | 15 |
| gen | 4 | 4 | 4 | 4 | 3 | 3 | 2 | * |
| gen.lin | 3 | 3 | 3 | 3 | 2 | 2 | 1 | * |
| pos | 0 | 1 | 2 | 3 | 4 | 5 | 6 | 7 |
| lin 2:Line 2 | (12, | 13, | 14, | 15, | 6, | 7, | 3, | *) |
| Displacement | 16 | 17 | 18 | 19 | 20 | 21 | 22 | 23 |
| gen | 4 | 4 | 4 | 4 | 3 | 3 | 2 | * |
| gen.lin | 3 | 3 | 3 | 3 | 2 | 2 | 1 | * |
| pos | 0 | 1 | 2 | 3 | 4 | 5 | 6 | 7 |

In Table 4, each cache line is identified by its absolute line displacement (lin) from the cache line containing the root node N1. The absolute node displacement from root node N1 (displacement) ranges from zero to 23 code words over the three cache lines illustrated. The absolute node generation (gen) is 1 in the first section and ranges from 2–4 in the second section for the reasons discussed above. The relative node generation with respect to the individual cache line (gen.lin) ranges from 1–3 in each line. Finally, the relative code word position within each cache line (pos) ranges from 0 to 7.

Figure 3:
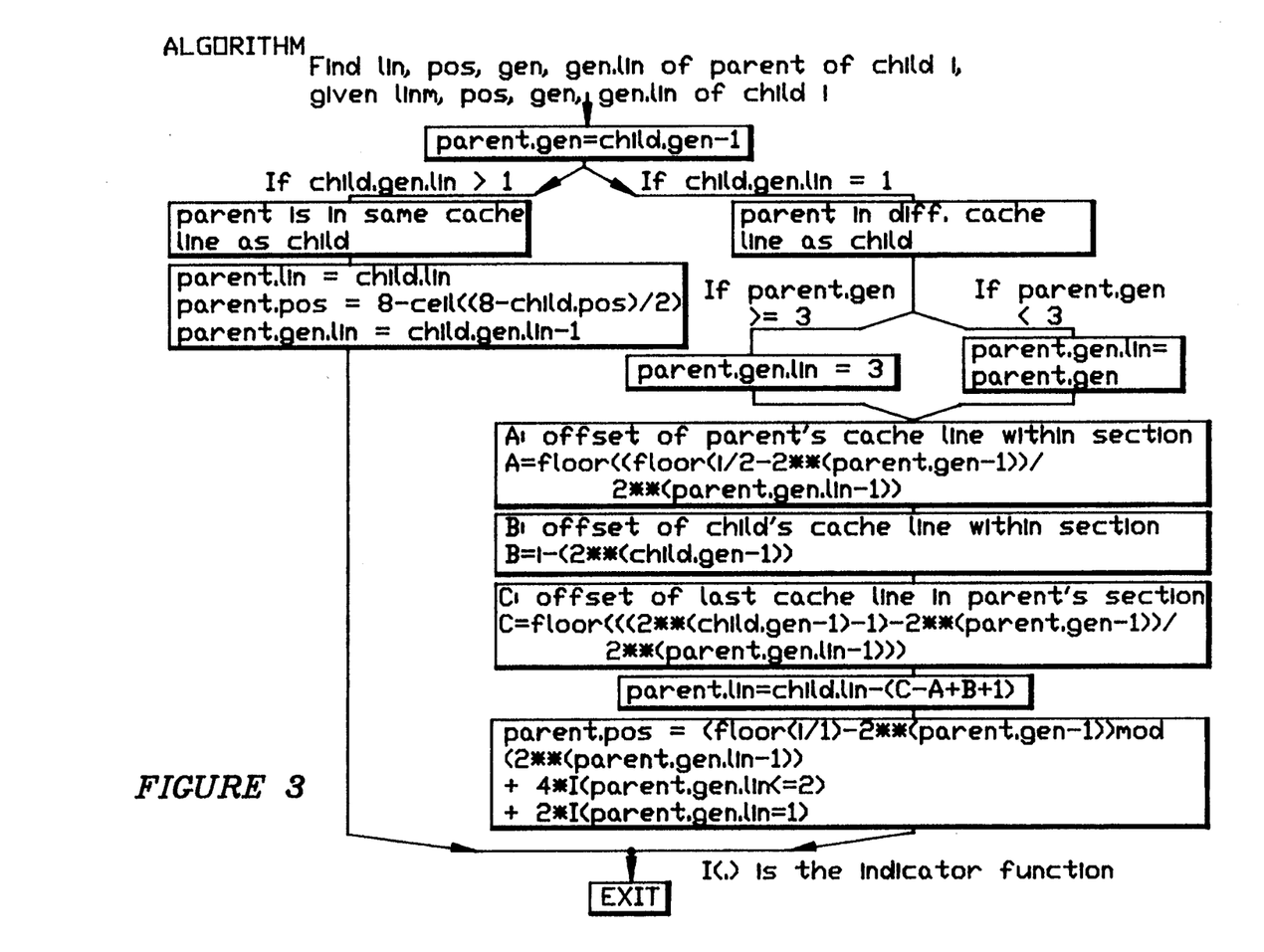
FIG. 3 shows a pseudocode chart illustrating the method of this invention for locating the parent node of a child node in memory.

For the location variable definitions shown in Table 4, the preferred algorithm for determining the precise location of a parent node is illustrated in flow chart form in FIG. 3. Obviously, FIG. 3 applies only to 8-word cache lines containing nodes from three generations and must be adapted for other cache line sizes in a manner that is obvious to practitioners in the art in view of these teachings.

Returning briefly to FIG. 1B, consider the following example upon identification of the "winning" key at node N14. Once the replacement node N14 is identified, the update path from N14 to root node N1 is also known. The first step of the following prefetching procedure is to set a pointer to the leaf node N14, child i.

Let gen be the distance of the child i from the root +1. The root node has gen = 1, and any leaf node has gen = k (for a tournament tree having $2^{k-1}$ nodes). Let gen.lin denote the generation within a cache line as shown in Table 4. Nodes belonging to three generations are contained in each cache line. For ease of presentation, this example is restricted to trees having more than seven nodes so that each leaf node will always have gen.-lin = 3. Thus, every node is uniquely identified by a line offset (lin) from the root node line and a code word offset within the line (pos).

During the execution of the sort procedure, a trace is made from the child i node to the root node. Knowing child i node, both the line offset (lin i) and the position offset (pos i) are also known. It is also known that the relative generation number (gen.lin i) = 3 because it was assumed that the tree has at least seven nodes. Thus, it is known that the immediate parent to child i is in the same cache line at a different position (pos), which can be computed according to the pseudocode flow chart shown in FIG. 3.

After the parent to child i is identified, the same algorithm is again used to identify the parent to the parent of child i. This process continues recursively in the manner shown in FIG. 3. When child.gen.lin = 1, it is known that the parent node lies in a different cache line from the child node. This then shifts the algorithm to the branch on the right-hand side of FIG. 3, which includes a procedure for identifying the new cache line as well as a new procedure for locating the position (pos) of the parent node within the new cache line.

Thus, the prefetching method of this invention permits the immediate computation of the cache line locations of all nodes within the tournament tree that subject to change as result of the replacement of the contents of child i node. Accordingly, once identified, all such cache lines can be prefetched from main memory into cache as necessary immediately upon identification of the winning key in the tournament tree and even before replacement of such key. Finally, following key replacement at the winning node i, the Offset Value Codes and pointer fields discussed in connection with FIG. 1B can be revised without cache misses because all necessary lines are prefetched into cache. It will be appreciated that the node clustering method of this invention minimizes the number of line prefetches required for each replacement and the ancestor node localization method of this invention permits prefetching of these few necessary lines. In combination, these two methods operate to minimize cache misses during tournament sorting procedures.

Performance Analysis

The following discussion shows the performance improvement expected for the methods of this invention. Of necessity, the following discussion relies on several machine-dependent assumptions.

Each node code word is assumed to include a key, a tag pointer, and a home pointer, for a total of 8 bytes. The code words (CWs) are organized into code word blocks (CWBs) of $2^{n-1}$ CWs, where n equals the number of CWs that fill a single cache line. A single cache line is assumed to be 128 Bytes in length and n is assumed to be eight. An IBM 3090 implementation is assumed, wherein a cache hit requires two CPU cycles, a cache miss requires 33 CPU cycles to the first double word, and an additional 15 cycles to fill the cache line.

It is assumed that 10 CPU cycles are required to process each code word traversed when a new code word is added to the selection tree. It is also presumed that a micro-instruction exists or can be implemented to prefetch a cache line.

The replacement of a code word in a selection tree that is N layers deep requires an update path traversal of N code words. If all the traversed code words are in cache, the time required to replace a key is:

$$T = N*(10+2) \text{ CPU Cycles} \tag{1}$$

For a 120K record sort, the tournament tree must have 16 levels, giving T=192 cycles from Equation (1). This agrees with the 196 cycles per record noted in actual measurements using pre-sequenced data with DFSORT.

If the entire tournament tree is too large to fit completely into cache, the performance becomes a function of the code word arrangement in memory. The clustering method of this invention places seven codes words within a single cache line and organizes all necessary cache lines into a single Code Word Block (CWB) as shown below in Table 5 for the 15-node tournament tree structure discussed in connection with Table 3.

TABLE 5

| CWB Arrangement |
| --- |
| CWB 0 = *,*,*,*,*,*,1,* |
| CWB 1 = 8,9,10,11,4,5,2,* |
| CWB 2 = 12,13,14,15,6,7,3,* |

Referring to Table 5, assume that the insertion node is node 12. This immediately identifies the nodes to be traversed as 12, 6, 3 and 1. With the arrangement shown in Table 5, CWB 2 and CWB 0 must be prefetched. These prefetches are initiated immediately following identification of node 12. The prefetch is ordered with CWB 2 first and then CWB 0. Once the prefetch is initiated, the winner from node 12 is written to the run list outside cache and the cache insertion operation ended. The tournament tree software then fetches the next insertion key from its queue and invokes the Insert Code Word instruction, as can be appreciated by examining Table 6 below.

TABLE 6

| Insert Code Word Cycles |
| --- |
| Determine winner and Prefetch CWB 2 & CWB 0 (cycle starts) |
| End Op of previous Insert Code Word |
| Set up for next Insert Code Word |
| Insert Code Word - takes to    cycle 33 for accessing CW 12 |
|     cycle 43 for processing CW 12 |
|     cycle 45 cache accessing CW 6 |
|     cycle 55 for processing CW 6 |
|     cycle 57 cache accessing CW 3 |
|     cycle 67 for processing CW 3 |
|     cycle 69 cache accessing CW 1 |
|     cycle 79 for processing CW 1 |
|     ... insert 12 cycles per layer here (the cycle ends after the last layer is processed) |
|     cycle 83 Prefetch insert node |
|     cycle 87 Prefetch other CWB |
|     cycle 88 End Op |

Thus, the basic CPU timing equation for a too-large tree size is:

$$\text{Cycles} = 31 + \text{Layers}*12 \tag{2}$$

Without prefetching, an additional cache miss must be added for every three layers traversed in the tree. This changes Equation (2) to the following:

$$\text{Cycles} = 31 + \text{Layers}*12 + \text{Ceiling}(\text{Layers}/3)*31 \tag{3}$$

In Equation (3), the term "Ceiling(Layers/3)*31" is the CPU overhead cost of not having a hardware cache prefetching capability. For a 120K record sort, the cycle time computed from Equation (2) is 223 cycles and the additional time represented in Equation (3) is 186 cycles for a total of 409 cycles. Thus, Equation (2) with prefetch saves 45% of the CPU cycles required over Equation (3) having no prefetch capability (186/409), which is an 83% improvement in throughput.

Without the node clustering method of this invention, even more cache misses must occur. Because the number of cache misses is not deterministic, the following timing equation is an approximation.

$$\text{Cycles} = (\text{Layers}-3)*33 + 3*12 \tag{4}$$

In Equation (4), the CPU overhead cost is in the "layers" multiplier of 33. For the 120K record sort, Equation (4) requires 465 cycles, compared to the 223 cycles from Equation (2). Thus, Equation (2) represents a 52% reduction in CPU cycles required over the Equation (4) embodiment having neither the prefetch nor the node clustering improvements of this invention (242/465), which is a 109% improvement in throughput.

Note that timing Equation (1) applies to the situation where the entire tournament tree can be simultaneously loaded into cache. If the size of the tree exceeds cache capacity, then the tournament sort is usually accomplished by using the maximum size tree that can fit and then merging the resulting sort "runs". The inventors have tested a benchmark using a pre-sequenced file compared with a random sequence file of the same size to determine that the increased CPU overhead of the necessary subsequent merging processes approximately doubles the CPU cycle requirements of Equation (1). This leads to the following for too-big trees:

$$\text{Cycles} = 24*\text{layers} \tag{5}$$

For Equation (5), the primary overhead expense is the "layer" multiplier of 24. For 120K record sort, Equation (5) requires 384 cycles compared to the 223 cycles from Equation (2). Thus, the node clustering method of this invention represented in Equation (2) provides a 42% reduction in CPU cycles required over the prior art for sorting tournaments that are too large to fit entirely into cache (161/384), which is a 72% improvement in throughput.

A simple Code Word (CW) processing implementation in hardware could reduce the 10 CPU cycles otherwise required because the necessary function is quite simple. The current winner CW is merely compared to the CW of the parent node and, if the winner CW is greater than the parent node CW, then compared to the next parent node CW in the path. If the winner CW is less than the parent node CW, the (now old) winner CW is stored in the parent node and the new winner replaces the old in the internal register that stores the "winner". The next parent node CW is then compared to this new winner and so forth. If any comparisons are equal, the hardware operation could end to permit the software to break the tie. During the processing of the last CW, the hardware function could also defer to software or microcode.

Such a hardware implementation of the CW comparison discussed in connection with FIG. 1B should take no more than 2 cycles over the cycle requirements for accessing the CW if the winning node wins the parent comparison. One of these cycles is the compare operation and the other is the test of a set-up for the next generation. Where the winner loses the comparison with the parent node, an additional cycle is required to swap the registers and a second additional cycle is necessary to put away the old winner, giving a total of four cycles for the hardware operation. Thus, on average, it is reasonable to assume a hardware implementation having an average 3 cycle operation plus the cache access time of 2 cycles per level. Such a hardware implementation can be represented by an approximate timing equation of:

$$\text{Cycles} = 5*(\text{layers}) + 33 \quad (6)$$

For a 120K record sort, the cycles required from Equation (6) is 113 cycles, a 71% reduction representing a throughput improvement of 240% over the 384 cycles required by Equation (5) for prior art sorting of too-large trees.

Of course, obvious refinements of the node clustering storage arrangements can be deduced from the teachings herein. For example, it is possible to further cluster parents with their children within the same cache line to reduce the (pos) distance from parent to child in a single line. Referring to FIG. 2A and Table 1 above, the clustering scheme can be revised to the one illustrated in Table 7 below.

TABLE 7

| Cache Lines | |
|---|---|
| Section 1: | |
| Line 1 | (4,5,2,6,7,3,1) |
| Section 2: | |
| Line 1 | (32,33,16,34,35,17,8) |
| Line 2 | (36,37,18,38,39,19,9) |
| Line 3 | (40,41,20,42,43,21,10) |
| Line 4 | (44,45,22,46,47,23,11) |
| Line 5 | (48,49,24,50,51,25,12) |
| Line 6 | (52,53,26,54,55,27,13) |
| Line 7 | (56,57,28,58,59,29,14) |
| Line 8 | (60,61,30,62,63,31,15) |

Referring to Table 7, consider Section 1, line 1, which formerly contained (4, 5, 6, 7, 2, 1) in Table 1. The parent of nodes 4 and 5 was moved next to node 5, which places the parent of nodes 6 and 7 next to node 7. Now, in Table 7, if the parent resides in the same cache line, it resides an average of 1.67 positions to the right of the child. In the arrangement shown in Table 1 above, the average distance is 2.5 positions. This reduction could make the parent available earlier if there is a cache miss because the missed cache line is normally fetched in round-robin style starting from the byte whose reference caused the miss. Typically, however, the prefetching technique of this invention will avoid all cache misses.

Obviously, other embodiments and modifications of this invention will occur readily to those of ordinary skill in the art in view of these teachings. Therefore, this invention is to be limited only by the following claims, which include all such obvious embodiments and modifications when viewed in conjunction with the above specification and accompanying drawings.

We claim:

1. In a CPU having a main memory and a line-oriented cache coupled to said main memory, a method for generating sort strings of records while minimizing the number of cache reference misses per record, each said sort string being an ordering of keys of said records, said method including a selection tree having one or more sets of sub-tree nodes, said method comprising the steps of:

(1) sizing and writing into counterpart cache lines one or more said keys corresponding to said sets of sub-tree nodes such that no more than one node in each said cache line has a parent node in another said cache line; and (2) until exhaustion of said records, performing the recursive steps of:
 (a) copying at least one said key from said main memory to said cache,
 (b) comparing keys within said cache to identify the replacement node, which contains the smallest said key,
 (c) prefetching from said main memory to said cache the cache lines containing ancestor nodes of said replacement node, and
 (d) writing the key from said replacement node to said main memory, whereby said keys are written as one or more orderings into said main memory.

2. The method of claim 1 wherein said performing step (2) comprises the additional step of:
(b.1) determining the cache line location of the parent node of another said sub-tree node.

3. The method of claim 2 wherein said determining step (2)(b.1) comprises the additional steps of:
(b.1.1) determining whether said replacement node is the one node within its cache line that has an outside parent node; and
(b.1.2) identifying the ancestor nodes extending between said outside parent node and the root node of said selection tree.

4. In a CPU having a main memory, a new use for a line-oriented cache coupling said memory for sort string generation of m records while minimizing the number of reference misses per record to said cache, said sort string generation being manifest as a nested ordering of keys of said records, comprising the steps of:

(a) sizing and writing maximal sets of sub-tree nodes of a nested ordering of subsets resident in main memory into counterpart cache lines, said subsets being ones of m/s such subsets of s keys;

(b) during a first pass, until said m/s subsets are exhausted, repeatedly calling m/s subsets of keys from main memory into cache and arranging each said subset into a partial nested ordering thereof including prefetching from main memory a cache line formed from a sub-tree of ancestor nodes immediate to the cached node selected for ordering, and writing said selected node to main memory; and (c) during a second pass, where t<s, repeatedly executing a t-way replacement selection merge in the cache from among at least one key selected from each of t nested orderings of said subsets resident in main memory until said m/s orderings are exhausted.

5. In a CPU having a main memory for storing program sequences and records, an LRU-managed cache coupling said memory, and means responsive to program sequences for accessing the contents of said main memory and said cache such that
   (1) upon a main memory location being read and its contents being concurrently stored in cache, further read references to the main memory location being routed to the cache, and
   (2) upon a main memory location being written, the same contents being concurrently written into cache,
      a new use for the LRU-managed cache for generation of sort strings of m records while minimizing the number of cache reference misses per record,
      said m records being initially stored in main memory,
      said sort string generation being manifest as a nested ordering of keys of the records,
      said method comprising steps of:
   (a) sizing and writing maximal sets of sub-tree nodes of a nested ordering of subsets resident in main memory into counterpart cache lines, said subsets being ones of m/s such subsets of s keys;
   (b) during a first pass, until m/s subsets have been exhausted, repeatedly calling m/s subsets of keys from main memory into cache and arranging each said subsets into a partial nested ordering thereof, including prefetching from main memory a cache line formed from a sub-tree of ancestor nodes immediate to the cached node selected for ordering, and writing said selected node to main memory; and
   (c) during a second pass, where $t<s$, repeatedly executing a t-way replacement selection merge in the cache from among at least one key selected from each of t partial nested orderings of the subsets resident in main memory until m/s such orderings become exhausted.

6. In a data processing system for performing an external selection tree replacement sort of a plurality of records, said system having a main memory and a line-oriented cache coupled to said memory, said selection tree having one or more sets of sub-tree nodes, an apparatus for minimizing the number of cache reference misses per record during said sort, said apparatus comprising:
   memory partition means in said main memory for sizing and writing into counterpart cache lines one or more said sets of sub-tree nodes such that no more than one node in each said cache line has a parent node in another cache line;
   selection means in said cache for identifying the cached sub-tree node having the minimum key within a sub-tree and for labeling said node as the replacement node; and
   prefetching means connected to said selection means for prefetching the cache lines containing ancestor nodes of said replacement node in response to identification of said replacement node.

* * * * *